United States Patent [19]
Lenhart

[11] Patent Number: 5,549,423
[45] Date of Patent: Aug. 27, 1996

[54] DAMPERLESS CONTROLLED SPEED AIR CONVEYOR

[75] Inventor: Ronald A. Lenhart, Lakewood, Colo.

[73] Assignee: Simplimatic Engineering Company, Lynchburg, Va.

[21] Appl. No.: 465,839

[22] Filed: Jun. 6, 1995

Related U.S. Application Data

[63] Continuation-in-part of Ser. No. 80,508, Jun. 24, 1993, Pat. No. 5,478,173.

[51] Int. Cl.⁶ ............................................. B65G 51/03
[52] U.S. Cl. ........................................ 406/86; 406/88
[58] Field of Search ............................. 406/86, 88; 226/7, 226/97; 34/359, 432, 576, 579, 580, 581, 582, 583, 584, 585

[56] References Cited

U.S. PATENT DOCUMENTS

| | | | |
|---|---|---|---|
| 3,105,720 | 10/1963 | Barker | 406/88 |
| 3,180,688 | 4/1965 | Futer | 406/88 |
| 3,385,490 | 5/1968 | Malmgren et al. | 226/7 |
| 3,437,335 | 4/1969 | Gluskin | 271/8.1 |
| 3,733,056 | 5/1973 | Fong | 366/107 |
| 4,014,576 | 3/1977 | Druschel et al. | 406/38 |
| 4,033,555 | 7/1977 | Fong | 366/101 |
| 4,165,132 | 8/1979 | Hassan et al. | 406/10 |
| 4,392,760 | 7/1983 | Futer | 406/88 |
| 4,456,406 | 6/1984 | Lenhart | 406/88 |
| 4,500,229 | 2/1985 | Cole et al. | 406/88 |
| 4,732,513 | 3/1988 | Lenhart | 406/88 |
| 4,744,702 | 5/1988 | Wiseman et al. | 406/88 |
| 5,037,245 | 8/1991 | Smith | 406/88 |
| 5,209,387 | 5/1993 | Long et al. | 226/97 |
| 5,222,840 | 6/1993 | Ingraham et al. | 406/88 |

FOREIGN PATENT DOCUMENTS

92/04113  3/1992  WIPO.

Primary Examiner—Andrew C. Pike
Attorney, Agent, or Firm—Fields, Lewis & Rost

[57] ABSTRACT

A damperless, controlled speed, coverless, isometric air conveyor and method for conveying lightweight containers en masse or individually at a controlled speed includes a first set of louvers extending through a conveyor surface from a common plenum at an incline to a conveying surface so that the air passing through the louvers has a downstream force vector of a first magnitude. A second set of louvers extend through the conveyor surface from the common plenum at an incline to the conveyor surface so that the air passing through the louvers has an upstream force vector of a second magnitude which is less than the first magnitude thereby creating a vector force differential in the downstream direction at any given location under the bottom of each container to cause movement of the containers in the downstream direction. An outboard row of louvers along each edge of the conveying surface may be angled in the inboard direction to urge the mass of containers toward the center of the conveying surface into a tight pack and to provide a downstream force to assist in moving the mass in the downstream direction and to cause a cross flow of air creating an air barrier through which a single or sparse flow of containers must move, thereby limiting the speed of the single or sparse containers. The inboard cross flow of air also creates low pressure at the trailing edge of the single or sparse containers to maintain them in an upright position.

18 Claims, 5 Drawing Sheets

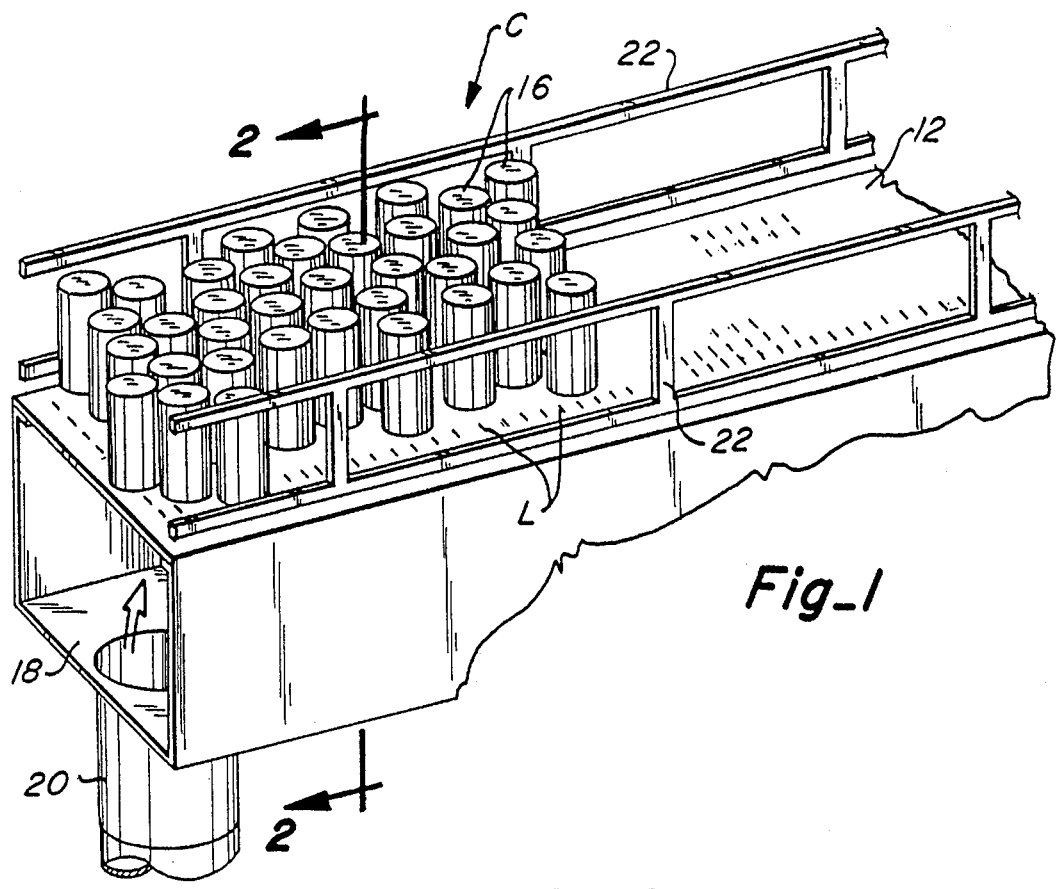
Fig_1
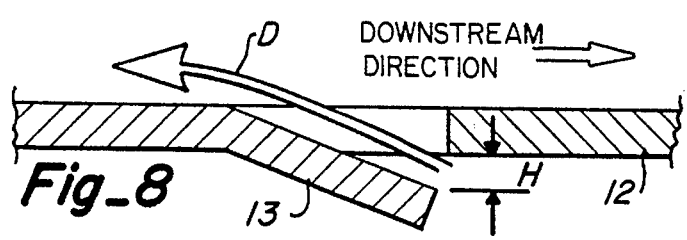
Fig_8
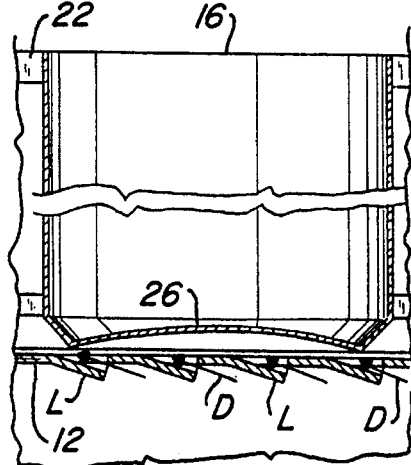
Fig_3
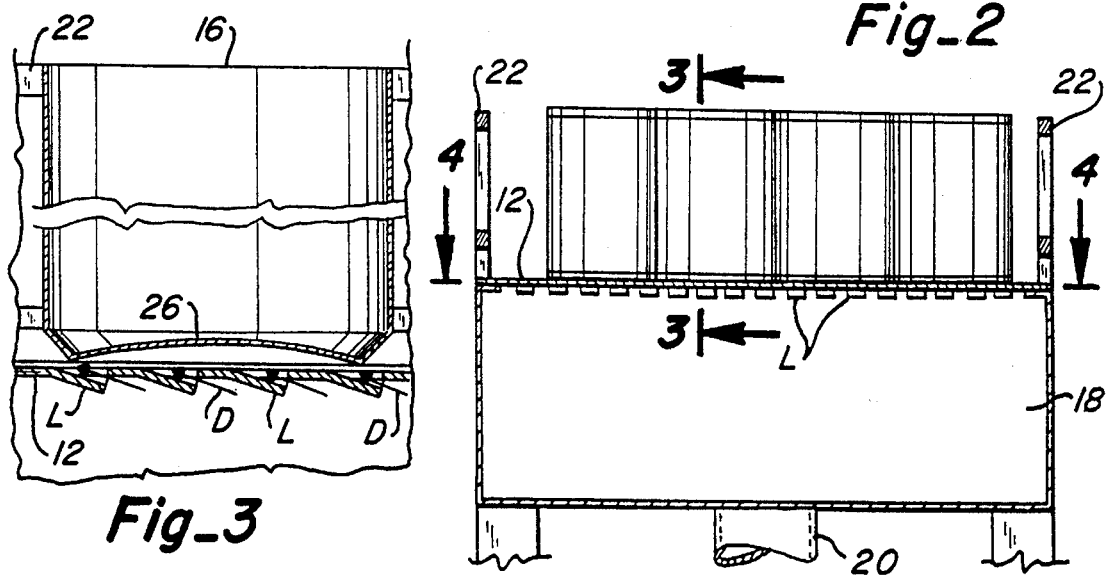
Fig_2

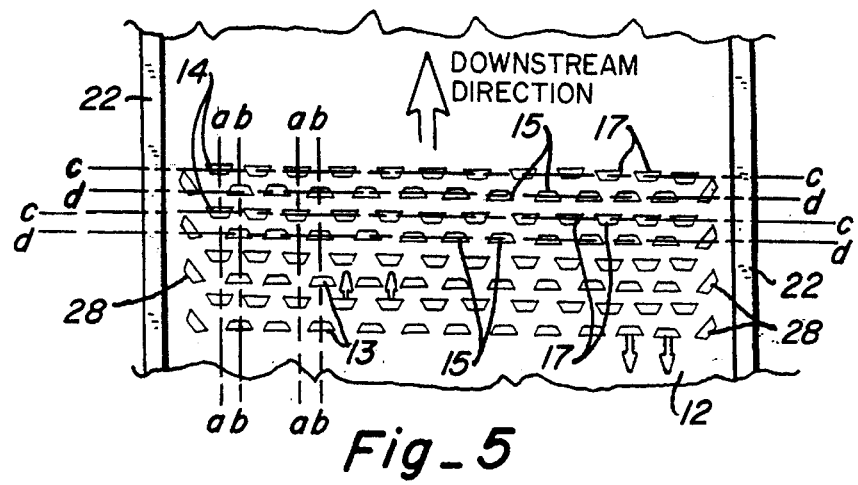
Fig_5
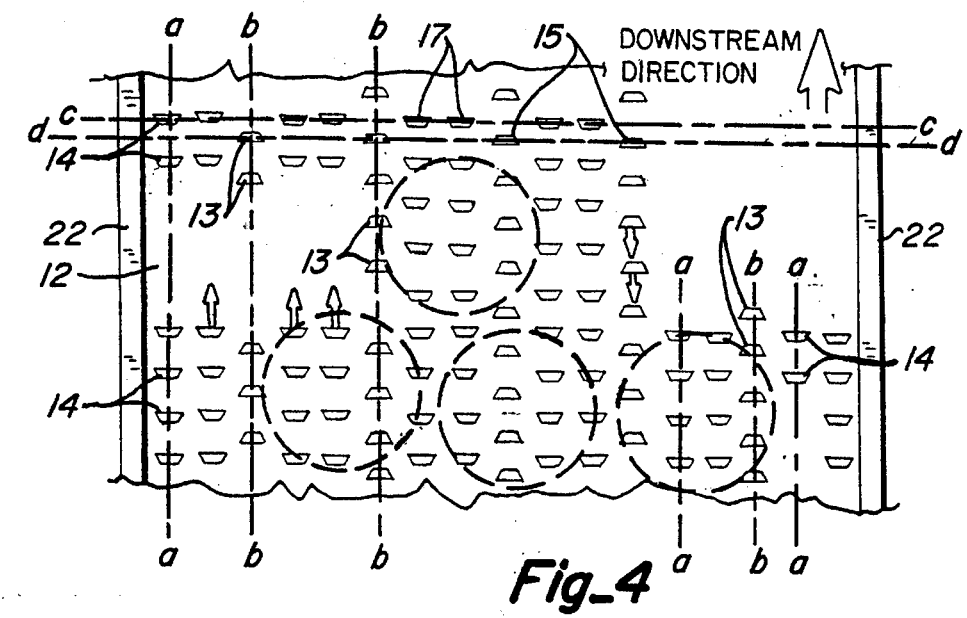
Fig_4
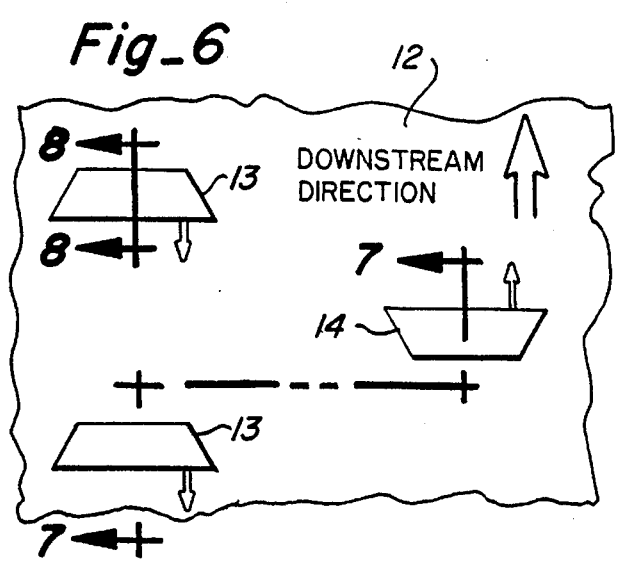
Fig_6
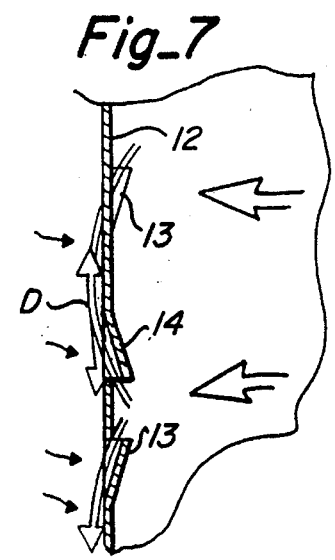
Fig_7

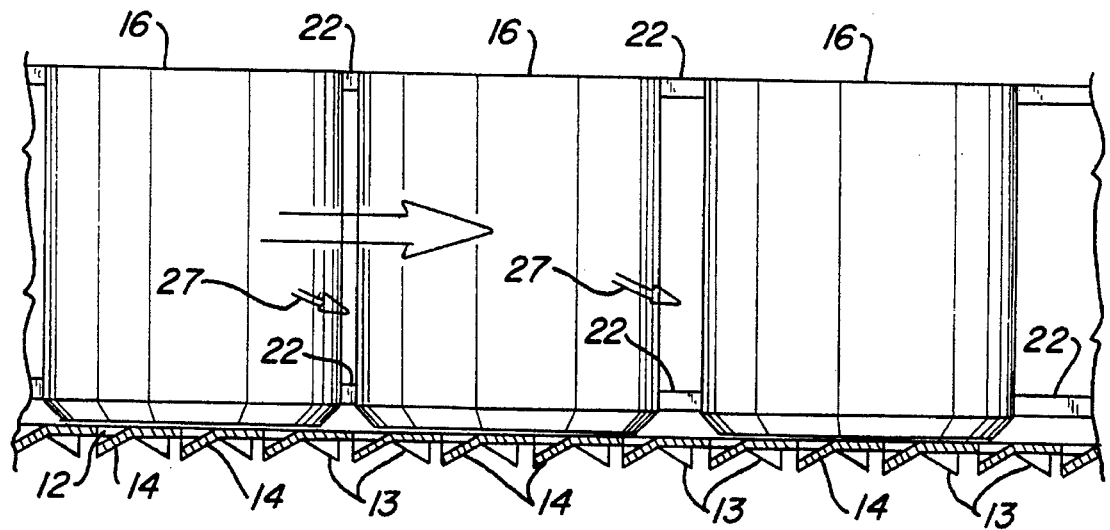
Fig_9
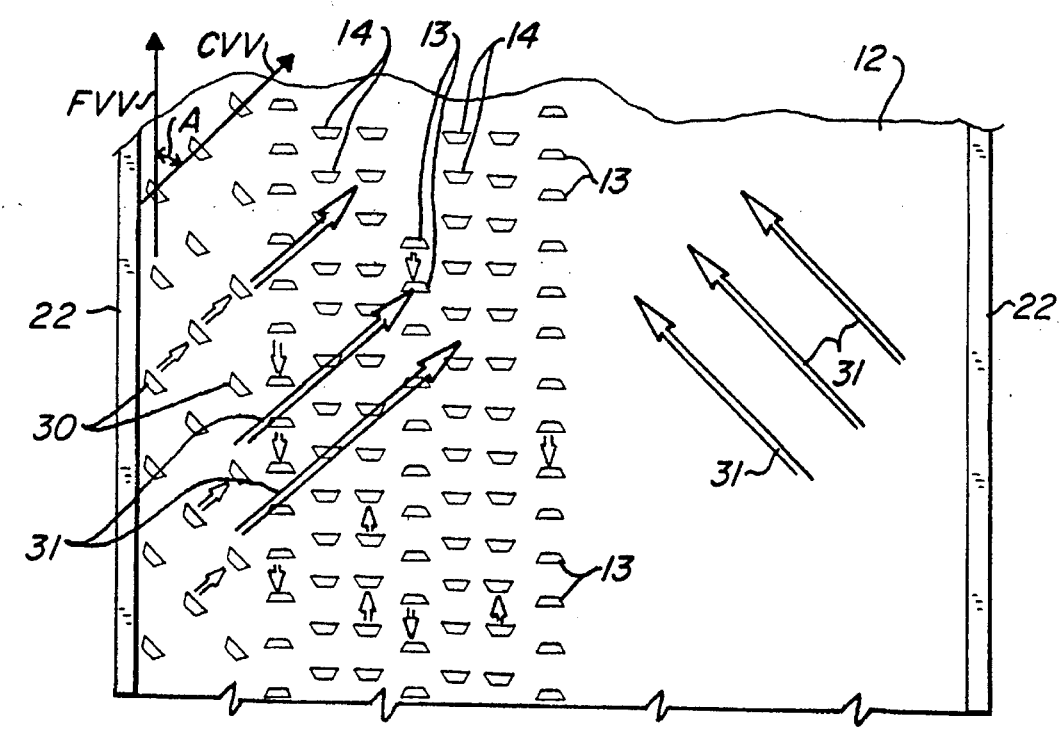
Fig_10

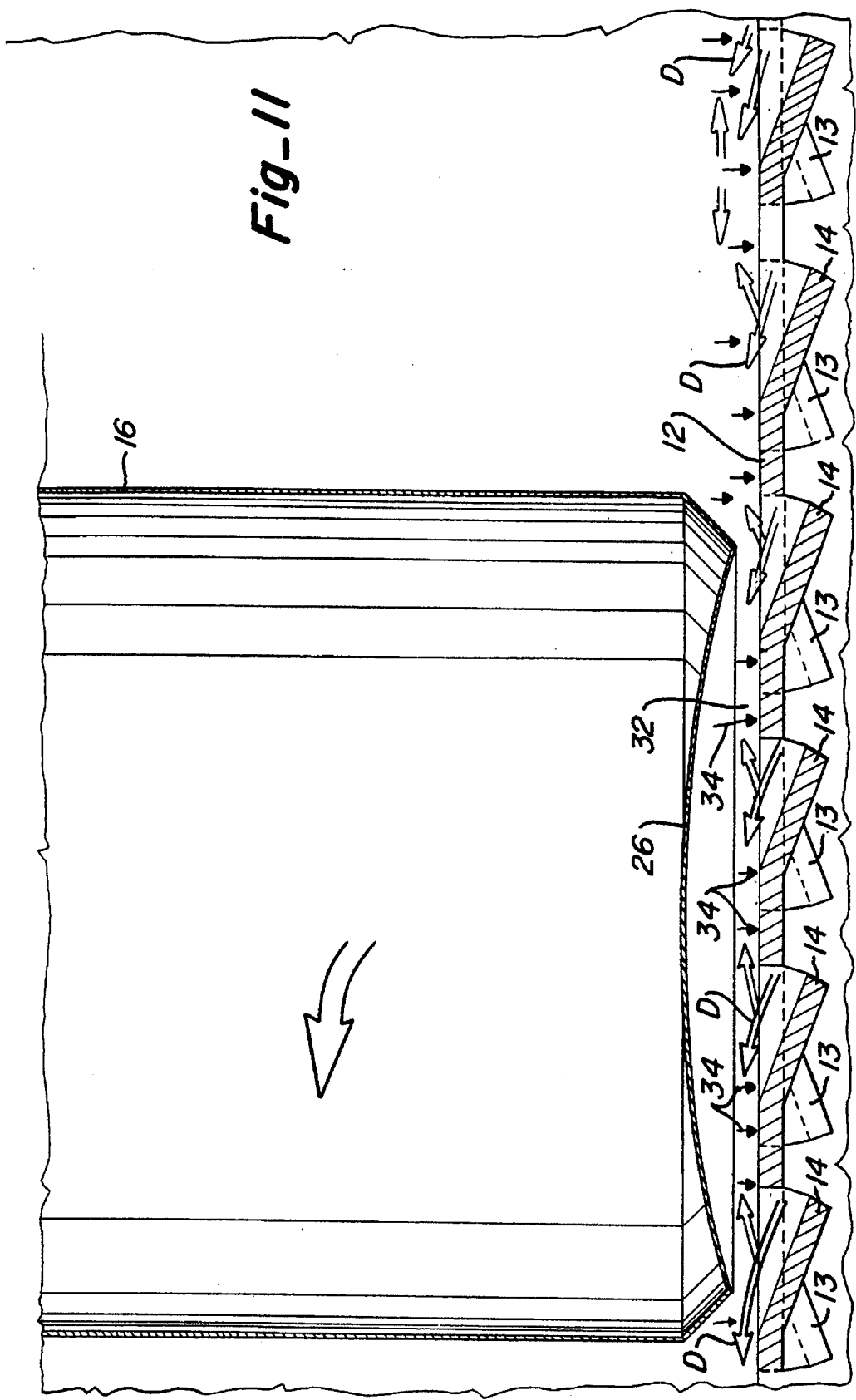

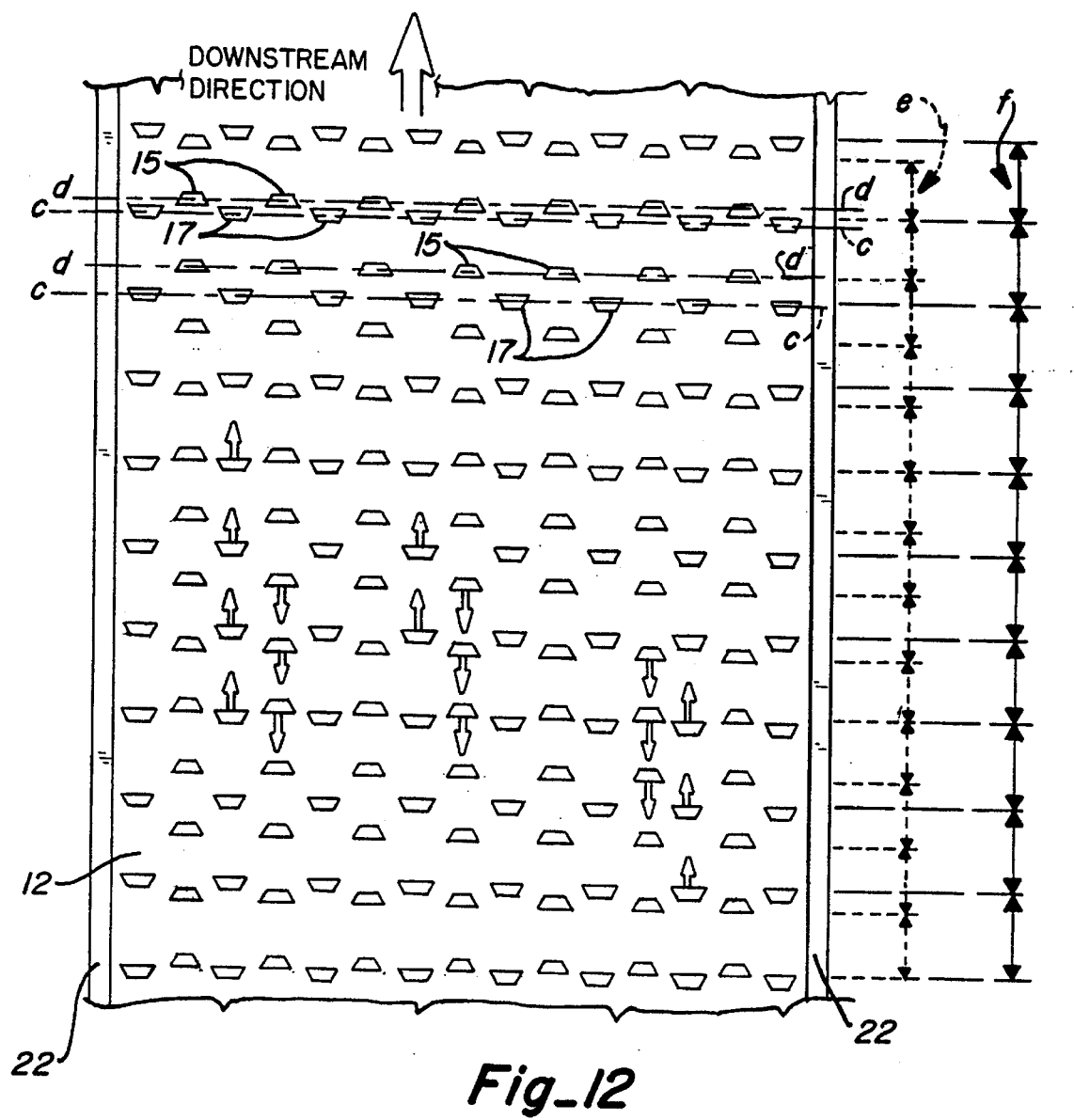
Fig_12

DAMPERLESS CONTROLLED SPEED AIR CONVEYOR

This is a continuation-in-art of my co-pending U.S. patent application Ser. No. 08/080,508 filed Jun. 24, 1993 entitled "Damperless Controlled Speed Air.

TECHNICAL FIELD

This invention relates to an air conveyor apparatus for use with generally cylindrical lightweight containers and more particularly to a damperless conveyor which controls the conveying speed of the containers whether en masse or in a sparse or individual flow of containers.

BACKGROUND ART

In recent years, air conveyors have become popular for conveying lightweight containers, such as cylindrical lightweight beverage containers, both during the manufacturing of the containers and during the filling operation. Such conveyors have enjoyed considerable success because they allow the conveying of the containers at a much higher speed than was possible with mechanical conveyors. These air conveyors have used, in various forms, air jets and louvers for moving the containers along the conveying surface. The angle at which air is introduced to the conveying surface has included jets or louvers directing the air parallel to the direction of movement as well as various angles transversely to the direction of movement. In general, it has been the intent of these devices to use the blowing force of the air to move the containers in the desired direction.

Also, devices have been developed by the inventor in which air is supplied through air jets in a manner to take advantage of the Coanda Effect to cause the air to move along the surface of the conveyor and therefore along the lower surface of the container on the conveyor. This effect, together with utilizing the Bernoulli Principle, is utilized to create low pressure in the areas at which the air flows at the highest velocity so as to maneuver the containers in response to changes in air pressure rather than relying on the ability of the device to blow the containers in the desired direction. These principles have been used to create desired high and low pressure areas between adjacent containers to regulate their flow.

Barker, U.S. Pat. No. 3,105,720, shows the use of louvers at opposite ends of cylindrical containers for moving them vertically from one conveyor to another.

Futer, U.S. Pat. No. 3,180,688, discloses a mass conveyor which utilizes a series of louvers and vertical jets. The vertical jets suspend the containers above the conveyor while the louvers provide a downstream propelling force for moving the containers in the downstream direction.

Malmgren et al., U.S. Pat. No. 3,385,490, disclose a device for conveying web or sheet material along a conveyor in which louvers are provided which are angled inwardly from the outboard edges of the conveyor toward the center. An exhaust grid is provided at the center of the device for evacuation of air. This device is intended to center a sheet of material and convey it downstream due to the downstream force component of the air passing through the louvers. The inboard component of the air from the louvers is intended to be equal on both sides and therefore center the sheet material over the conveyor.

Fong, U.S. Pat. Nos. 3,733,056 and 4,033,555, each discloses a conveyor for fluidizing particulate material and utilizes louvers pointed in both a downstream direction and a direction substantially transversely to the direction of movement.

Hassan et al., U.S. Pat. No. 4,165,132, disclose an air conveyor for conveying semiconductor wafers wherein air jets are provided at an inboard angle from the side edges of the conveyor for suspending and centering the wafers over the conveyor. These jets also create a downstream force component which moves the wafer along the conveyor in the downstream direction.

Lenhart, U.S. Pat. No. 4,456,406, discloses a mass conveyor requiring a top cover and utilizes the formation of high pressure areas between containers to form air barriers for the containers to maintain them in a loose separate condition as they move through the conveyor. This is to minimize banging of the containers against each other and potential damage to them due to this banging action.

Lenhart, U.S. Pat. No. 4,732,513, provides a coverless air conveyor in which jets are provided through the conveying surface in a substantially vertical direction with a slight downstream tilt. Side walls are provided to form air dams to create a flowing body of air which enveloped and lifted the respective containers and moved them at a desired speed. However, if any adjustment is desired in the speed of movement of the mass of containers, it is necessary through dampers to vary the volume of air passing through the jets.

All of the foregoing inventions are suitable for their intended purposes. However, in order to control the flow of the containers on the conveyor, it is necessary to provide dampers at various positions along the plenum in order to control the amount of air issuing through the air jets or louvers of any particular location along the conveying surface. This is necessary in order to change the speed of the movement of the containers from one portion of the conveyor to the next to minimize potential damage to the containers as they move from one operative station to another. When using dampers in an effort to control the speed of a container, as the static pressure is varied upward and downward, the velocity from the deck louvers varies accordingly, and as the velocity varies the volume also varies. This makes control very difficult because of the two parallel variables. If the pressure is set too low in an attempt to slow the speed of the container, the container will not be levitated sufficiently above the deck surface and cannot be conveyed. Conversely, if the pressure is set too high, in order to convey the container at the higher speed, the container will be levitated too high above the deck and may wobble, so that it does not flow smoothly down the air conveyor and may tip over, creating a jam along the conveyor.

Furthermore, with the mass air conveyors discussed above, as a container moves from an upstream location to a downstream location, the volume of air acting on each container increases thereby tending to move the containers at greater and greater speeds, toward a terminal velocity. This is particularly true with single or sparse containers moving along the conveyor. Such a condition can result in containers striking each other with sufficient force to cause damage to fragile containers, such as beverage containers.

DISCLOSURE OF THE INVENTION

In accordance with the present invention, a damperless, controlled speed, coverless isometric air conveyor and method for controlling containers en masse at a controlled speed is provided. The term "isometric" as used herein means and refers to opposing air volumes creating opposed force vectors along the upper surface of the deck of the conveyor. The term "louver", as used herein, includes any opening through the deck of the conveyor which directs air along or across the conveyor. A first set of louvers extend through the conveyor surface in a downstream direction at an incline to the conveying surface so that the air passing through the louvers has a downstream force vector of a first magnitude. A second set of louvers extend through the conveyor surface in an upstream direction at an incline to the conveying surface so that the air passing through the louvers has a upstream force vector of a second magnitude which is less than the first magnitude thereby creating a vector force differential in the downstream direction to cause movement of the containers in the downstream direction. The louvers along each edge of the conveying surface may be angled in the inboard direction to cause a cross flow of air which tends to bunch a mass of containers in the center portion of the conveyor in a tight pack and provide an additional downstream force component to move the containers in the downstream direction. Additionally, the angled louvers create an air barrier through which the containers must move, thereby being particularly effective for limiting the speed of single or sparse containers that are normally difficult to control. The inboard cross flow of air also creates a low pressure drafting effect at the trailing edge of the containers to assist in maintaining them in an upright position.

More specifically, according to one conceptual view of the louver arrangement, a first set of longitudinally extending louvers is arranged in alternating arrangement with a second set of longitudinally extending louvers wherein an outboard row of longitudinally extending louvers on each side of the deck or conveying surface is always part of the first set. This assures that there is at least one more row of louvers in the downstream direction than in the upstream direction.

Alternatively, multiple rows of longitudinally extending louvers in the downstream direction can be provided with longitudinally extending upstream louvers interspaced therebetween. Also, at least the first outboard row of downstream longitudinally extending louvers can be angled in the inboard direction to provide air flowing transversely of the direction of movement of the containers to create an air barrier to impede movement of single or sparse flow of containers. However, when the conveyor is full of containers the longitudinally extending louvers will all be substantially covered so that the only flow of air is against the bottom of the containers to move them en masse in the desired downstream direction due to the net downstream force vector.

The rows of longitudinally extending louvers have been defined as longitudinally traversing the conveyor surface; however, the rows of louvers can also be defined as traversing laterally across the conveyor surface because of their symmetrical arrangement on the conveyor surface. That is, depending upon the conceptual view taken, the first and second sets of louvers can be defined as arrangements of either laterally or longitudinally extending rows that traverse the conveyor surface.

By varying either the number of downstream louvers with respect to the upstream louvers, by varying the angle of the incline of the louvers with respect to the conveyor surface, or by varying the size of the individual louver openings, a very precise flow of containers can be obtained without the need to vary static air pressure in the plenum or to provide dampers at various incremental locations within the plenum. Also, depending upon the size of the containers and the spacing of the louvers, the use of both downstream and upstream louvers enables air contacting the containers at any location between an upstream location and a downstream location along the conveyor to move them at a substantially constant speed because of a uniform volume of air communicating with them. The speed of the containers is determined by the differential air volume in the downstream direction relative to the upstream air volume. With this construction, containers such as cylinders open at one end and lightweight containers such as STYROFOAM® plates can be conveyed without loss of control.

When conveying single or sparse containers, the "footprint" or area covered by the bottom of each container in comparison with the louver arrangement is an important consideration for uniform and stable levitation of the containers above the conveyor surface to minimize wobbling. The area covered by the container must be such that both the upstream and downstream louvers are positioned under the bottom of each container regardless of its position on the conveyor surface. Since there are more downstream louvers than upstream louvers, there will be a net downstream air flow under each container bottom.

Additional advantages of this invention will become apparent from the description which follows, taken in conjunction with the accompanying drawings.

BRIEF DESCRIPTION OF THE DRAWINGS

FIG. 1 is a fragmentary perspective view of a conveyor constructed in accordance with this invention;

FIG. 2 is a vertical section, taken along line 2—2 of FIG. 1, showing further details of the conveyor;

FIG. 3 is an enlarged vertical section, taken along line 3—3 of FIG. 2, showing the air flow through the louvers with respect to the bottom of a container on the conveyor;

FIG. 4 is an enlarged fragmentary plan view taken along line 4—4 of FIG. 2 of one conveyor surface constructed in accordance with this invention;

FIG. 5 is a fragmentary plan view, similar to FIG. 4, but showing an alternative louver arrangement;

FIG. 6 is a greatly enlarged fragmentary section of a portion of a conveyor surface like that of the conveyor surface in FIG. 4 showing details of the louver arrangement;

FIG. 7 is an off-set horizontal section, taken along line 7—7 of FIG. 6, showing further details of the louver construction;

FIG. 8 is a greatly enlarged horizontal section, taken along line 8—8 of FIG. 6, showing the air flow through a louver;

FIG. 9 is a vertical section, similar to FIG. 3, but showing a mass of containers along the conveyor;

FIG. 10 is a fragmentary plan view, similar to FIGS. 4 and 5, showing a third alternative louver arrangement;

FIG. 11 is a greatly enlarged vertical section of a portion of the conveyor surface showing the flow of air through the louvers with respect to the bottom surface of a container; and FIG. 12 is a fragmentary plan view, similar to FIGS. 4 and 5, but showing a further alternative louver arrangement.

BEST MODE FOR CARRYING OUT THE INVENTION

In accordance with this invention, as seen in FIGS. 1-3, a conveyor C is provided which has a conveying surface in the form of a deck 12 with a plurality of louvers L therein for conveying lightweight containers 16 from an upstream location to a downstream location as will be more fully discussed below. A plenum 18 is attached to the bottom side of deck 12 and is supplied by air from a common air supply, such as a blower (not shown) through an inlet 20. Open rails 22 are provided along the outboard edges of deck 12 to hold the containers on the conveying surface. As seen in FIG. 3, the air passes through the louvers and, due to the Coanda Effect, travels along the surface of the deck in the direction of arrows D. The flow of air emitted from the louvers creates a low pressure area thereby holding the bottom 26 of container 16 closely adjacent the deck 12. The principles of this feature of the invention will be more fully explained below.

The isometric deck design of this invention is based upon opposing air volumes at the same velocities. A preferred louver design on the conveyor deck is shown in FIG. 4. In this embodiment, the first two longitudinal rows of louvers 14 from each outboard edge direct flow in the downstream flow direction. The longitudinal downstream rows are illustrated as traversing longitudinally along the deck 12 along lines a—a. The next inboard row of longitudinal louvers 13 is in the opposing upstream direction followed by the next two inboard rows of longitudinal louvers 14 in the downstream flow direction and then repeating the pattern. The longitudinal upstream rows are illustrated as traversing longitudinally along the deck 12 along lines b—b. Assuming a total of twenty-three longitudinal upstream and downstream rows, the following will exemplify the pattern. Sixteen longitudinal rows are in the downstream flow direction and seven longitudinal rows are in the upstream opposing upstream flow direction. This gives 228% more louvers in the downstream flow direction. To achieve a desired single container maximum speed along deck 12, assume that only 25% more air volume is needed in the downstream flow direction than the upstream direction. 228% less 25%= 203%. This requires an increase in the louver area of the seven rows of upstream louvers 13 with respect to the downstream flow louvers by 203% over the sixteen rows of the downstream flow louvers 14.

Alternatively, the louvers may be defined in lateral rows. As best seen in FIG. 5, a first set of lateral rows 15 laterally extend or traverse across the conveyor surface wherein an interspersed and alternating second set of lateral rows 17 extend or traverse laterally across the conveyor surface. The first set of louvers 15, as shown in FIG. 5, direct flow in the upstream direction, and the second set of louvers 17 direct flow in the downstream direction. The lateral upstream rows 15 are illustrated as traversing laterally along the deck 12 along line d—d. The lateral downstream rows 17 are illustrated as traversing laterally across the deck 12 along lines c—c. To achieve desired single container maximum speed control, when the rows are defined laterally, the same type of calculations as described above with respect to FIG. 4, can be made. That is, more louvers can be provided in the downstream direction and then the area of the louvers in the upstream direction can be adjusted.

Another method to achieve single container maximum speed control is to vary the center-to-center spacing of rows 15 and 17. For example, the downstream rows 17 could be spaced longitudinally apart a distance denoted by distance e while the upstream rows 15 could be spaced longitudinally apart a distance denoted by distance f which is greater than distance e. Thus, the number of downstream rows would exceed the number of upstream rows over a predetermined length of deck 12. The structure for this method of speed control is shown in FIG. 12 wherein downstream rows 17 are spaced longitudinally closer together than upstream rows 15.

The louvers in the deck may be of a trapezoid design, as shown in FIGS. 6 and 7. With this design, the cross-sectional area of the louver may be varied within very close parameters which enables control of the volume of air dispersed through the louver. Referring to the above FIG. 4 example, the areas of the louvers in the seven rows could be increased by increasing the height H of the louver opening, as shown in FIG. 8, by a few more thousands of an inch, and the volume of air dispersed from the seven rows can be increased. Clearly, by varying height H the vector force differential can be precisely controlled. Ambient air is also drawn in through side rail 22, as shown by arrows 27 in FIG. 9, which assists in moving the containers in the downstream direction.

As best illustrated in FIG. 4, the "footprint" shown in dotted lines of each container covers both upstream and downstream louvers regardless of the location of the containers along the conveyor. This "footprint" configuration with respect to the louvers is important when single containers or a sparse flow of containers move along the conveyor and there are no adjacent containers to help hold the other containers in an upright position. Advantageously, since there are more downstream louvers under the bottom of each container than upstream louvers, the flow of air under the bottom of each container will have a net downstream magnitude. It will be understood that although reference has been made to the louver configuration of FIG. 4, the foregoing statements are equally applicable to the other louver configurations disclosed herein.

It is by the foregoing design that a very precise, nearly infinitely controllable air conveyor may be designed to suit required parameters. This precise control is made possible by today's very sophisticated punching equipment. When the deck is designed using a computer aided design system which calculates the percent of variation in the louver area by simply varying the height H of the louver opening, air conveying is taken into an entirely new era making it possible to do things that were considered highly unlikely or impossible only a short time ago. Thus, the manufacturing costs of air conveyors can be significantly reduced in comparison with commercially available air conveyors which generally require dampers along each eight feet of the plenum. Furthermore, the apparatus of this invention requires no top cover or other structure above the conveyor surface to assist in conveying containers.

It can be seen that by varying the louver height H or the number of louvers in the upstream or downstream direction, the isometric deck design may be configured to decelerate containers prior to entering a turn and accelerate them out of the turn at any point within the turn and then resume the maximum set speed. If the air conveyor were to interface with a mechanical conveyor supplying the containers, the isometric deck design may be configured to accelerate the containers away from the mechanical conveyor so as to disperse the density at which they are being supplied and then a gradual deceleration to the maximum set speed.

Based upon preliminary time studies along an eight-foot portion of the length of a sixteen-foot long conveyor with the isometric design, a single 12-oz aluminum 211×413 trimmed container, with the open end up, can travel at approximately 200 feet per minute and impact a static barrier of containers without falling over or causing any container damage. Tests were also run with the container impacting a fallen container and no upsetting occurred.

Based on the above test results, the following has been generated by way of example only:

| Conveyor width between guide rails = 17½" 7 containers wide × 4.6 containers/lineal ft. = 32.2 containers/lineal ft. Desired container per minute rate = 2500 CPM | | | |
|---|---|---|---|
| Container Density | Containers/ Lineal Ft. | FPM @ 2500 CPM | Estimated CPM |
| 100% | 32.2 | 80 FPM | 2576 |
| 87% | 28.0 | 90 FPM | 2520 |
| 75% | 24.0 | 104 FPM | 2496 |
| 62% | 20.0 | 125 FPM | 2500 |
| 50% | 16.0 | 156 FPM | 2496 |
| 43% | 14.0 | 179 FPM | 2506 |
| 40% | 13.0 | 192 FPM | 2496 |

The above is a deck design which will propel a single container along any distance at a maximum speed of approximately 200 FPM without a top cover on the air conveyor. This same deck design is also capable of conveying any container density shown at the FPM shown with minimum static pressure within the plenum. The container-to-container impact noise is extremely low. The containers are conveyed so gently that no container damage was detected.

By using one or more rows of longitudinal louvers near each of the outboard edges of the conveyor directed at an inboard angle, a cross flow of air over the conveying surface is created. A example of this is shown in FIG. 5 wherein an outboard row of longitudinal louvers 28 are angled inwardly with respect to the direction of travel.

A still further embodiment is shown in FIG. 10 wherein three diagonally extending rows of angled louvers 30 are provided along each outboard edge of deck 12. These louvers create a cross flow air which tends to bunch a mass of containers toward the center of the conveyor and provides an additional downstream force vector, as discussed below. When there are only single or a sparse flow of containers, this cross flow air acts as a barrier through which the single or sparse flow of containers must move. This cross flow air also has a drafting effect on the back or trailing side of the single or sparse flow of containers creating a low pressure area which pulls this trailing edge toward deck 12. On the other hand, when a mass of containers, say 100% density, are on the conveyor, then the cross flow air is restricted and the louvers act only on the bottom of containers to move the mass of containers in the downstream direction due to the net downstream force vector, previously described.

With the above method applied, it is possible to achieve a controlled single, sparse, or mass flow of containers at speeds that are substantially the same.

As the angle A, shown in FIG. 10, of the angled louvers 30 is changed, the flow direction of the air, as depicted by arrows 31, is changed. Angle A is defined by the angle between an axis depicting a forward velocity vector (FVV) and an axis depicting a cross velocity vector (CVV). The more perpendicular to the side of the conveyor the angle is, the more air resistance a single or sparse flow of containers have to move through which results in a greater drafting effect on the trailing edge of the containers.

As the containers become more densely packed on the conveyor, more louvers are covered and the space for free air flow becomes quite restricted. As a result, it is just the louvers beneath the containers that are acting on the containers. Under this condition, the flow volume and forward velocity vector (FVV) are the major factors for this control. This is true because the FVV provides an additional downstream force to move the mass of containers in the downstream direction.

The greater the volume of air discharged through the angled louvers 30, the more effective they will be in slowing the speed of single or sparse containers, yet at the same time, the angled louvers 30 will be effectively increasing the speed of densely grouped containers that pass over louvers 30.

By way of example, an object, such as a 12 oz. aluminum container, requires 0.5 inches of static pressure to provide an optimum volume of air beneath it to levitate it about 0.005 inches above the conveyor deck. At a static pressure of 0.5 inches of water, the air velocity through the louvers having an opening of 0.00808 square inches is at a speed of 2,832 feet per minute (FPM). If the inboard angle A of louvers 30 is 60°, the FVV is 30% of 2,832 FPM or a desirable air velocity of 850 FPM for conveying a dense pack of containers.

When the containers are being supplied onto the air conveyor randomly, the speed of the single and sparse flow will be controlled by the combination of the reverse and downstream louvers and CVV.

In tests, it has been possible to achieve a speed of 174 FPM on a single container and 151 FPM on a dense pack. These speeds are very acceptable to meet most any conditions. The significance of these observed speeds is that there is no container damage to single containers, and because of the relatively small speed differential between single and densely packed containers, little pressure is exerted on the containers when moving in a dense pack which results in no container damage.

Controlling the speed of a container in an air conveyor is an absolute prerequisite in today's market because of the ever increasing lighter containers. The lighter the container, the more it is susceptible to damage from container-to-container impact or container-to-guide rail impact at turns in the conveyor which are downstream of a straightaway conveyor section.

The angle of incline of the louvers from the deck surface is approximately 25° to 30°, as seen in FIGS. 8 and 11, creating a laminar flow of air across the deck surface, because of the Coanda Effect. This air travels at a high velocity relative to the surrounding ambient air. This greater air speed produces a decrease in pressure in accordance with the Bernoulli Principle. The Coanda Effect is the tendency of a jet of gas when discharged adjacent a surface to follow that surface even though it curves away from the jet axis. This causes entrainment of ambient air along the deck surface thereby reducing the pressure above it.

This low pressure area 32, in FIG. 11, acts to stabilize and pull the container toward the deck. As illustrated by arrows 34, the air escaping beneath the diameter of the container through the very slight 0.003 inch to 0.005 inch vertical space between the deck and the bottom of the container also creates a low pressure area further enhancing the drafting effect to draw the container toward the deck surface.

The shallow angle of incline of the louvers to the deck surface maintains the majority of the air flow at or very near the base of the container which is well below the center of gravity of the container. By minimizing the flow of air upward above the container center of gravity, the stability of the container is greatly enhanced. Accordingly, containers may be conveyed singly or randomly spaced apart without dependence upon adjacent contiguous containers for support to prevent tippage as they are when conveyed en masse.

From the foregoing, the advantages of this invention are readily apparent. A damperless, controlled speed, coverless air conveyor has been provided in which damage of fragile containers, such as lightweight aluminum beverage containers, is greatly minimized. By the use of an isometric design in which one set of louvers directed downstream and a second set of louvers directed upstream, the number and/or size of the louvers can be varied to provide precise differential downstream air flow to very precisely control the speed of a mass of containers moving from an upstream location to a downstream location along the conveyor. In addition, by providing one or more outboard louvers angled in a downstream and inboard direction, air barriers can be created by the cross flowing air to especially impede the movement of single or sparsely bunched containers so that they do not reach terminal velocity but rather flow at approximately the same rate as a mass of containers. In addition, by varying the number or size of the louvers along the deck, precise increases and decreases in the velocity of the containers can be obtained as required for making turns or entering or leaving a mechanical conveying device. Also, the net air volume in the downstream direction is substantially the same at any incremental position along the deck surface when the ratio between the downstream louver area to the upstream louver area is held constant. With this arrangement, the deck can have an upward incline from the upstream location to the downstream location of $5/16"$ per linear foot without requiring additional static pressure for moving the container. This isometric conveyor of this invention is usable with aluminum, steel, and plastic containers, as well as cylinders which are open at both ends and flat lightweight plates.

This invention has been described in detail with reference to particular embodiments thereof, but it will be understood that various other modifications can be effected within the spirit and scope of this invention.

I claim:

1. In combination, a plurality of upright lightweight containers, each having a cylindrical side wall extending from a bottom surface thereof, and a coverless conveyor for conveying said plurality of lightweight containers, said combination comprising:

said coverless conveyor having a surface extending from an upstream location to a downstream location for moving said plurality of upright lightweight containers en masse therealong, said surface having a center, first and second opposite side edges, and an underside;

a common plenum connectable to a source of air under pressure and attached to said underside of said conveyor surface for supplying the air under pressure;

said bottom surface of each of said plurality of upright lightweight containers being positioned in fluidic communication with said conveyor surface; and a first and a second set of louvers extending through said conveyor surface from said plenum for creating downstream and upstream force vectors of the air respectively which support said plurality of upright lightweight containers above said conveyor surface, said upstream and downstream force vectors of air creating a first low pressure area under each of said plurality of upright lightweight containers to maintain them in an upright position for downstream movement without tipping, said first and second sets of louvers being arranged in predetermined row arrangement on said conveyor surface to enable controlled movement of said plurality of upright lightweight containers at a controlled speed from the upstream location to the downstream location.

2. The combination, as claimed in claim 1, wherein:

said first and second sets of louvers create substantially the same amount of air volume in the downstream direction at any incremental location from the upstream location to the downstream location so that said plurality of upright lightweight containers move at a controlled uniform speed from the upstream location to the downstream location.

3. The combination, as claimed in claim 1, wherein:

there are a greater number of louvers in said first set of louvers than in said second set of louvers to create a downstream vector force differential.

4. The combination, as claimed in claim 1, wherein:

said first and second sets of louvers are selectively spaced longitudinally so that the predetermined row arrangement enables controlled movement of said plurality of upright lightweight containers.

5. The combination, as claimed in claim 1, wherein:

said first and second sets of louvers are selectively spaced laterally so that the predetermined row arrangement enables controlled movement of said plurality of upright lightweight containers.

6. The combination, as claimed in claim 1, wherein:

said first set of louvers has a greater total open area than said second set of louvers through which the air under pressure flows enabling controlled movement of said plurality of upright lightweight containers.

7. The combination, as claimed in claim 1, further including:

a third set of louvers positioned along each of said first and second opposite side edges of said conveyor surface, said third set of louvers each having a force vector of the air directed toward said center which creates an air barrier through which single or sparse numbers of said plurality of upright lightweight containers move to limit the speed of said single or sparse numbers of said plurality of upright lightweight containers and for creating a second low pressure area at trailing edges of each of said single or sparse numbers of said plurality of upright lightweight containers to pull said trailing edges toward said conveyor surface to maintain said single or sparse numbers of said plurality of upright lightweight containers in an upright position.

8. A method of conveying a plurality of upright lightweight containers, each having a cylindrical side wall extending from a bottom surface thereof, en masse from an upstream location to a downstream location at a controlled speed along a damperless, coverless, isometric air conveyor, said method comprising the steps of:

providing a coverless mass conveyor surface, having a center and first and second opposite side edges, said mass conveyor surface extending from the upstream location to the downstream location;

providing a common air plenum for supplying air to the conveyor surface;

moving air along the conveyor surface from the common plenum at an incline thereto so that the air has a downstream vector of a first larger magnitude;

moving air along the conveyor surface from the common plenum at an incline thereto so that the air has an upstream vector of a second lesser magnitude to provide a differential force vector in the downstream direction;

positioning the plurality of upright lightweight containers on the conveyor surface wherein said bottom surface of each container of the plurality of upright lightweight containers is of sufficient size to be acted upon by the air having the upstream force vector and the air having the downstream force vector;

conveying the plurality of upright lightweight containers from the upstream location to the downstream location along the conveyor surface by impinging the bottom surface of each container of the plurality of upright lightweight containers with the air having the upstream force vector and the air having the downstream force vector; and maintaining a first low pressure area under the bottom surface of each container of the plurality of upright lightweight containers to pull the plurality of upright lightweight containers toward the conveyor surface to maintain the plurality of upright lightweight containers in an upright position without tipping as they are conveyed from the upstream to the downstream location.

9. A method, as claimed in claim 8, including the further step of:

providing a uniform net volume of the air along the conveyor surface in the downstream direction at any predetermined location between the upstream location and the downstream location.

10. A method, as claimed in claim 8, including the further step of:

creating a cross flow of air along the conveyor surface to urge the plurality of upright lightweight containers toward the center of the conveyor surface to provide a downstream force to assist in moving the plurality of upright lightweight containers in the downstream direction, to create an air barrier to control downstream movement of the plurality of upright lightweight containers, and to create a second low pressure area at a trailing edge of the bottom surface of each container of the plurality of upright lightweight containers to stabilize their movement along the conveyor in the downstream direction.

11. A method of conveying a plurality of upright lightweight containers each having a side wall and a supporting bottom surface, at a controlled speed along a damperless, coverless, isometric air conveyor including a conveyor surface having a center and opposed side edges, from an upstream location to a downstream location, said method comprising the steps of:

providing said coverless conveyor having said conveyor surface extending from the upstream location to the downstream location;

providing a first set of louvers extending through the conveyor surface at an incline so that air passing therethrough has a downstream vector of a first magnitude;

providing a second set of louvers extending through the conveyor surface at an incline so that air passing therethrough has an upstream vector of a second magnitude, said first and second sets of louvers being arranged in a predetermined alternating arrangement;

positioning the plurality of upright lightweight containers on the conveyor surface at the upstream location for conveying to the downstream location, the bottom surface of each container of the plurality of upright lightweight containers being of sufficient size so that the bottom surface covers a portion of both upstream and downstream sets of louvers on the conveyor surface;

supplying the air to the first and second sets of louvers from a common plenum at a pressure and volume sufficient to elevate the plurality of upright lightweight containers above the conveyor surface;

directing the air through the first and second sets of louvers in a direction substantially parallel to the conveyor surface to create a first low pressure area between the bottom surface of each container of the plurality of upright lightweight containers and the conveyor surface to hold them in an upright position and in close proximity to the conveyor surface;

adjusting the total area of the first set of louvers with respect to the total area of said second set of louvers so that the first magnitude vector is greater than the second magnitude vector; and moving the plurality of upright lightweight containers from the upstream location to the downstream location along the conveyor via the air flow created by the difference in the first magnitude vector and the second magnitude vector.

12. A method, as claimed in claim 11, including the further step of:

directing a cross flow of air across the conveyor surface toward the center thereof by means of a third set of louvers to urge the plurality of upright lightweight containers toward the center of the conveyor surface into a tight pack to provide a downstream force to assist in moving the plurality of upright lightweight containers in the downstream direction, to create an air barrier to control downstream movement of the plurality of upright lightweight containers in the downstream direction, and to create a second low pressure area at a trailing edge of each container of the plurality of upright lightweight containers to stabilize the plurality of upright lightweight containers as they move along the conveyor surface.

13. An air conveying apparatus comprising:

a coverless conveyor surface having a center, first and second opposite side edges, and an underside;

a plurality of upright lightweight containers, each having a cylindrical side wall extending from a bottom surface thereof, said bottom surfaces being positioned above said conveyor surface; and means for creating downstream and upstream force vectors of air above said conveyor surface which support said plurality of upright lightweight containers above said conveyor surface, the upstream and downstream force vectors of air producing a first low pressure area under each of said plurality of upright lightweight containers to maintain them in an upright position for movement at a controlled speed from an upstream location to a downstream location without tipping.

14. An air conveying apparatus, as claimed in claim 13, wherein said creating means includes:

a first set of louvers for creating the downstream force vectors; and a second set of louvers for creating the upstream force vectors.

15. An air conveying apparatus, as claimed in claim 14, wherein:

said first and second sets of louvers create substantially a same amount of air volume directed to the downstream location at any incremental location from the upstream location to the downstream location so that said plurality of upright lightweight containers move at a controlled uniform speed therealong.

16. An air conveying apparatus, as claimed in claim 14, wherein said creating means further includes:

a common plenum connectable to a source of air under pressure and attached to said underside of said conveyor surface for supplying the air under pressure to said first and second sets of louvers.

17. An air conveying apparatus, as claimed in claim 13, further including:

means for directing force vectors of air from said first and second opposite side edges, respectively, toward said center to create an air barrier through which single or sparse numbers of said plurality of upright lightweight containers move in order to limit the speed of said single or sparse numbers of said plurality of upright lightweight containers and to create a second low pressure area at trailing edges of each of said single or sparse numbers of said plurality of upright lightweight containers to pull said trailing edges toward said conveyor surface to maintain said single or sparse numbers of said plurality of upright lightweight containers in the upright position.

18. An air conveying apparatus, as claimed in claim 17, wherein said directing means includes:

a third set of louvers positioned along each of said first and second opposite side edges.

* * * * *

UNITED STATES PATENT AND TRADEMARK OFFICE
CERTIFICATE OF CORRECTION

PATENT NO. : 5,549,423

DATED : August 27, 1996

INVENTOR(S) : Ronald A. Lenhart

It is certified that error appears in the above-identified patent and that said Letters Patent is hereby corrected as shown below:

Column 1, line 3, delete "art" and insert --part--; and
         line 5, after "Air", insert --Conveyor", now U.S. Patent No. 5,478,173

Signed and Sealed this

Seventh Day of April, 1998

Attest:

BRUCE LEHMAN

*Attesting Officer*              *Commissioner of Patents and Trademarks*

UNITED STATES PATENT AND TRADEMARK OFFICE
CERTIFICATE OF CORRECTION

PATENT NO. : 5,549,423 Page 1 of 1
APPLICATION NO. : 08/465839
DATED : August 27, 1996
INVENTOR(S) : Ronald A. Lenhart It is certified that error appears in the above-identified patent and that said Letters Patent is hereby corrected as shown below:

Column 1, line 5, after "application" insert --,--.

Signed and Sealed this

Twenty-third Day of October, 2007

JON W. DUDAS
*Director of the United States Patent and Trademark Office*